May 7, 1946.　　　I. WILLIAMS ET AL　　　2,399,969

APPARATUS FOR MAKING CARBON BLACK

Filed Feb. 15, 1944　　　2 Sheets-Sheet 1

Inventor
IRA WILLIAMS
FRANK W. SELFRIDGE

By Edwin C. Woodhouse
Attorney

Patented May 7, 1946

2,399,969

UNITED STATES PATENT OFFICE 2,399,969

APPARATUS FOR MAKING CARBON BLACK

Ira Williams and Frank W. Selfridge, Borger, Tex., assignors to J. M. Huber Corporation, Borger, Tex., a corporation of Delaware Application February 15, 1944, Serial No. 522,414

6 Claims. (Cl. 23—259.6)

This invention relates to new and improved methods and apparatus for manufacturing carbon black.

Ordinarily, carbon black is manufactured by burning a gaseous hydrocarbon as it issues from a number of slotted lava tips which are so positioned below flat metallic surfaces that the flames impinge and deposit carbon on such surfaces. The carbon as it is formed is scraped off of the surfaces and collected by means of hoppers. This apparatus is in a shed having outlets for the gaseous combustion products at the top and slot-shaped air inlets near the bottom. The burners and carbon collecting surfaces are positioned in the upper part of the shed. The air enters through the air inlets in the form of jets of substantial velocity. Such jets of air cause considerable turbulence in the air rising to the lava tips. The carbon collecting hoppers and at least part of the gas distributing system are positioned near the bottom of the shed, and the turbulence in the air is considerably increased by the jets of air striking such accessory apparatus.

In order to obtain the highest yields of carbon black of the most uniform quality, the flames from the lava tips should be steady. However, since the gas issuing from the lava tips is at a low velocity, the flames are easily affected by the currents of air, and the turbulence in the air, as it rises to the burner tips, causes the flames to become unsteady and greatly decreases the yield of carbon black. Also, such turbulence in the air causes currents of air to impinge upon the flames so that the air mixes with the flames and causes the combustion of an undesirable amount of the gas to further reduce the yield of carbon black.

It is an object of our invention to provide an improved method for making carbon black wherein the turbulence in the air rising to the burner tips is largely inhibited whereby the yield and quality of the carbon black is largely improved. Another object of our invention is to provide improved apparatus which largely eliminates the turbulence in the air rising to the flames, whereby the flames are rendered more steady and the yield and quality of the carbon black produced are materially improved. A further object is to provide apparatus for the usual carbon black shed which will greatly reduce the velocity of the air entering the shed, diffuse the air more uniformly throughout the bottom of the shed, and cause the air to rise to the flames in a materially less turbulent condition. A still further object is to advance the art. Still other objects will appear hereinafter.

The above and other objects may be accomplished in accordance with our invention, which comprises expanding and diffusing the streams of air entering the shed through the usual air inlets so that the velocity of the air entering the shed is reduced to less than one-fifth of its original velocity, before it is permitted to flow upwardly to the burners, and the turbulence in the air flowing to the burners is substantially reduced, by placing baffling means in the shed adjacent the air inlets so as to baffle and diffuse the streams of air, said means providing air inlets of an area at least five times the area of the usual air inlets. By this method and apparatus, the turbulence in the air as it reaches the flames is largely eliminated so that the flames are materially more steady and larger yields of carbon black of a more uniform quality are obtained.

Our invention will be more readily understood from the more detailed description which follows when taken in connection with the accompanying drawings, in which.

Figure 1:
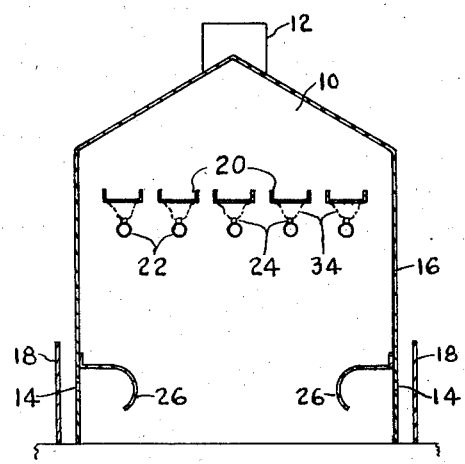
Fig. 1 is a somewhat diagrammatical view in vertical cross-section, showing a conventional carbon black producing element, with parts omitted for purposes of clarity in illustration, and showing one form of our invention.
Figure 2:
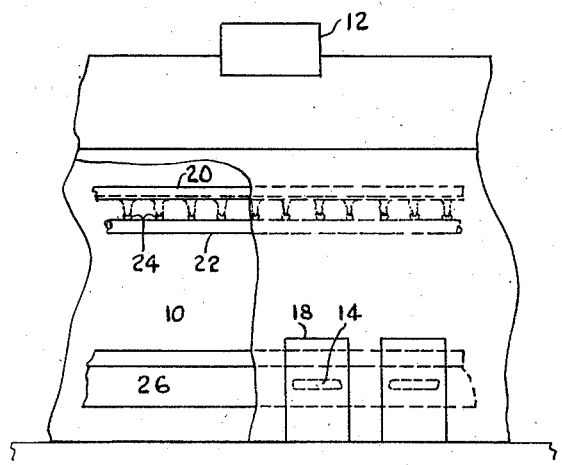
Fig. 2 is a side view of the structure of Fig. 1, with parts broken away to more clearly show the essential parts of the structure.

Referring in more detail to Figs. 1 and 2, the numeral 10 represents a typical burner shed which may be from about 8 to about 14 feet wide, about 9 to about 14 feet high and about 100 to about 200 feet long. This shed is provided with outlets 12 for the gaseous combustion products. In each side wall 16 of the shed, there is provided a series of air inlets 14. As is usual, such air inlets may be in the form of slots about one to about three inches wide, about 18 to about 24 inches long and spaced apart by distances equal to or greater than the lengths of the slots. Such slots are usually positioned at from about 6 to about 15 inches above the floor of the shed. The size and number of the slots will, as usual, be determined by the requirements of the shed and the burners to provide the amount of air required to give the best yields of carbon black of the desired quality.

The amount of air which passes through each slot 14 is further controlled by a flat sheet 18 which is larger than and covers the slot on the outside of the shed. The air passing through the slot is regulated by the distance of the sheet 18 from the slot, the sheet being bent toward or away from the wall 16 for this purpose.

Also shown in Figs. 1 and 2, are the usual burner pipes 22 provided with slotted lava tips 24 in the upper portion of the shed 10. Above each burner pipe is provided a channel iron 20, upon the lower surface of which the carbon is deposited by the flames 34 of burning gas impinging upon such surfaces.

The structure, as so far described, is a common and conventional structure ordinarily used in the manufacture of carbon black. Also included within the burner house will be the usual scraping elements, carbon collecting hoppers and gas distributing system, which are not shown. In such apparatus, the air entering through the slots 14 is in the form of jets having a velocity which will usually vary between about 250 and about 600 feet per minute. This causes turbulence in the air rising to the burner tips 24, which turbulence is further increased by the jets of air impinging upon the collecting hoppers, gas distributing system and other accessory apparatus in the shed. Such turbulence in the air greatly decreases the yield of carbon by causing the flames to be unsteady and causing the air to impinge upon and mix with the flames.

Also shown in Figs. 1 and 2 is a baffling and diffusing element 26 which is one embodiment of our invention. Such diffusing element 26 extends into the shed from the wall above the slots, and, at a substantial distance from the slots, extends downwardly in front of the slots but terminates a substantial distance from the floor of the shed. A baffling and diffusing element 26 may be provided for each slot, but we have generally found it to be more desirable and convenient to provide a single element extending substantially continuously for the entire length of the shed, forming a single diffuser for all of the slots in a single wall of the shed.

In operation, the jets of air entering the shed through the slots 14 strike the downwardly extending wall of the diffuser element 26, expand in all directions so that the pressure is equalized and the air then escapes into the shed through the area between the lower edge of the downwardly extending wall of the baffle or diffuser and the floor of the burner house. Thus, the space between the lower edge of the downwardly extending wall of the baffle 26 and the floor of the burner house forms an air outlet for the air in the space bounded by the baffle 26 and the wall 16 of the burner house. The air passing through such outlet will have a velocity proportional to the size of the outlet. Generally, such outlet should have an area of from about 5 to about 70 or more times as great as the area of the slots 14, whereby the velocity of the streams of air passing through such outlets will be not more than one-fifth the velocity of the streams of air passing through the air inlets. By so reducing the velocity of the air entering the main portion of the shed, we are able to substantially eliminate the turbulence in the air rising to the flames and thus increase the yield of carbon black and produce carbon black of more uniform quality.

Figure 3:
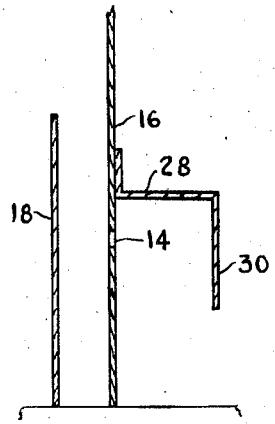
Fig. 3 is a detailed cross-sectional view showing a modified form of the baffling means of our invention.

In Fig. 3, the baffling and diffusing element consists of a horizontal wall 28 extending into the shed from the wall 16 thereof and positioned above the air inlet 14. At the outer end of the horizontal wall 28, there is provided a vertical wall 30 extending down in front of the slot 14 but terminating a substantial distance from the floor of the shed.

Figure 4:
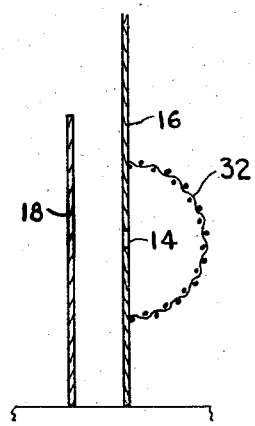
Fig. 4 is a detailed cross-sectional view showing another form of the baffling means of our invention.

In the embodiment shown in Fig. 4, the baffle and diffusing element is made of a relatively fine mesh wire screen in the form of a semicircle. We have employed satisfactorily, in such embodiment, ordinary 16 mesh house screen, although screen of different mesh may also be employed, if desired. In this form of baffle, we have found that the air will be more uniformly diffused if several layers of screen are employed. With 16 mesh house screen, three or four layers of screen give excellent results. The use of screen in accordance with this embodiment gives the highest reduction in velocity of the air. For example, with slots one inch wide and 8 inches long, a screen diffuser having a radius of 6 inches will increase the area through which the air enters the shed to approximately 71 times the area of the slot. Increasing the radius of the baffle will rapidly increase the ratio of the area of the air outlets to the area of the slots.

Figure 5:
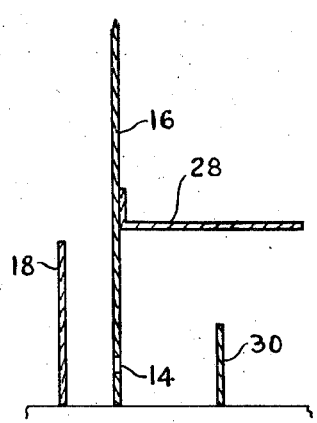
Fig. 5 is a detailed cross-sectional view showing still another form of the baffling means of our invention.

Fig. 5 represents a modification of Fig. 3. Where the slot 14 is close to the floor of the shed, as in Fig. 5, the vertical wall 30 in front of the slot will extend upwardly from the floor of the shed, and the horizontal inwardly extending wall 28 will be spaced above the upper edge of the wall 30 so as to form the air outlet for the baffle and diffuser. In this modification, it is also desirable to have the wall 28 extend into the shed past the vertical wall 30 so as to direct the air into the shed in a substantially horizontal direction.

Figure 6:
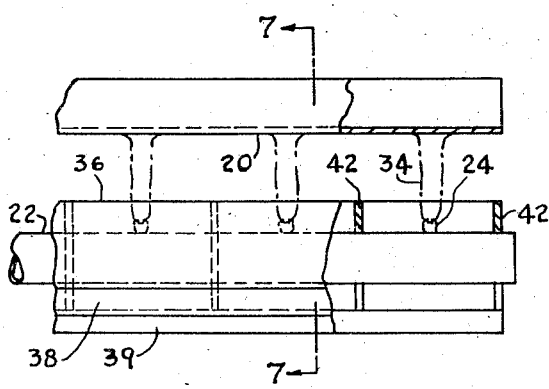
Fig. 6 is a side view, with parts broken away, showing air guides which may be employed in combination with the invention of the present application.
Figure 7:
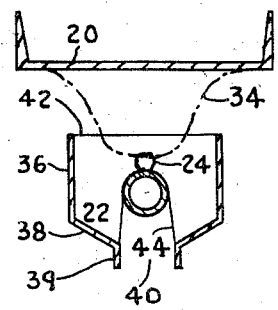
Fig. 7 is a cross-sectional view taken on line 7—7 of Fig. 6.

Fig. 6 and Fig. 7 show one embodiment of a form of air guide forming part of the invention disclosed and claimed in our co-pending application Serial No. 368,047 filed November 30, 1940. This air guide has vertical walls 36 on each side of the burner pipe and extending downwardly a substantial distance below the flames. Near the lower end, the walls are bent slightly inwardly as at 38 and then downwardly at 39 to form a restricted opening 40 to control the velocity of air passing between the guide walls. The guide walls are joined to and separated by partitions 42 having U-shaped openings 44. The partitions 42 rest upon the burner pipe and support the air-guiding structure thereon. These air guides operate to further reduce the turbulence in the air and guide the air up to the flame in substantially streamline viscous flow parallel to the direction of the flame. Such air guides are quite effective even in the absence of the baffling and diffusing elements, but, in combination with the baffling elements, more completely remove the turbulence from the air and provide conditions more nearly approaching the ideal conditions for producing the maximum yield of carbon black of maximum uniformity in quality.

The sheds and the sheets 18 are ordinarily made of sheet iron. They may of course be made of other suitable materials having sufficient rigidity for the purpose and which will withstand the temperatures produced in the burner sheds. The baffling and diffusing elements of our invention and the air guides 36 may also be made of sheet iron or other sheet metal such as steel, aluminum, nickel, copper, chromium plated metal, nickel plated metal, ceramic or other materials which will have sufficient strength and rigidity to hold their form and which will withstand the temperatures ordinarily found in apparatus of this type.

The baffling or diffusing members may extend a considerable distance into the shed up to about one-quarter the width of the shed. It is only necessary to avoid extending them so far into the shed as to form a jet of air upwardly between them. Ordinarily, for the sake of economy and costs, they will not extend more than about 12 inches into the shed.

In order to more clearly illustrate our invention, preferred embodiments thereof and modes of carrying the invention into effect, the following examples are given:

Example 1

An experimental burner house, seven feet long by five feet wide by six feet high and containing four collecting channels seven inches wide and six feet long, each of which collected the carbon from fourteen burner tips, was used to prepare carbon black by burning natural gas. The gas was burned at the rate of fifty-four cubic feet per tip per twenty-four hours. The tips, having a slot width of 0.044 inch, were spaced at 4.75 inch intervals along the burner pipes and were 2.75 inches below the collecting channels. Square pieces of aluminum foil were suspended by thin fibers through the area between the floor and the burner pipes in order to indicate the degree of turbulence in the air. The shed was found to be correctly drafted by two slits one inch wide and eight inches long on each side of the shed and placed about ten inches above the floor. The slits therefore provided draft openings having a total area of 32 square inches. The air passed through the slits at a velocity of 570 feet/minute. During operation of the shed, the aluminum foil indicators were in motion in the entire area and were strongly agitated in the lower half of the area. The yield of carbon was found to be 2.30 pounds per 1,000 cubic feet of gas burned.

A diffusing member was then constructed as shown in Fig. 3. The vertical member was placed six inches in front of the slit, was seven inches high, and the bottom was six inches above the floor. The diffusing member extended the length of the burner house. Thus, the diffuser increased the area of the draft openings to 1008 square inches or 31.5 times that provided by the slits. During operation with the diffusing member in position, the aluminum foil indicators were disturbed somewhat near the floor, but were not disturbed in the upper portion of the area between the burner pipes and the floor. The yield of carbon was 2.44 pounds per 1,000 cubic feet of gas burned, an increase of over 6% in yield.

Example 2

The experiment of Example 1 was repeated except that the burners were equipped with air guiding members such as those of Figs. 6 and 7. The yield of carbon, without diffusers and with diffusers, was 2.55 and 2.67 pounds, respectively, per 1,000 cubic feet of gas burned, an increase of over 4.7% in yield.

Example 3

A commercial unit, consisting of a shed 200 feet in length with ten collecting channels, was ordinarily drafted through 66 two inch slits sixteen inches long spaced about twenty inches apart and ten inches above the floor, the full length of each side of the shed. The slits therefore provided draft openings having a total area of 4230 square inches, through which the air passed at a velocity of 310 feet/minute. This unit was equipped with diffusers as shown in Figs. 1 and 2, placed ten inches in front of the draft opening, the lower edge being about six inches from the floor. These diffusers thus increased the area of the draft openings into the shed to 28,800 square inches or 6.6 times that of the slits. The yield of carbon was increased somewhat more than 0.1 pounds per 1,000 cubic feet of gas burned or more than 6%, by the presence of the diffusing members.

It will be understood that the foregoing examples and the modifications shown in the drawings are given for illustrative purposes solely, and that various modifications and variations may be made therein without departing from the spirit or scope of our invention. For example, other forms of the baffling and diffusing elements will occur to those skilled in the art. Further, while we have shown the air inlets 14 in the form of slots in the side walls of the burner shed, it will be apparent that such inlets may take other shapes, may be spaced varying distances above the floor of the burner shed but below the burners, and may be in the end walls or in the floor of the burner shed. We have further introduced the air near the center of the shed near the bottom thereof by means of duct work and, by the use of baffling and diffusing elements constructed in accordance with the principles of our invention, have obtained beneficial results. Accordingly, our invention is not to be restricted to the specific embodiments disclosed, but we intend to cover our invention broadly as in the appended claims.

We claim:

1. In an apparatus for making carbon black by the impingement process which includes a shed having outlets for gaseous products at the top thereof and small air inlets adjacent the bottom thereof controlling the amount of air entering the shed and through which streams of air normally enter the shed at a velocity sufficient to cause substantial turbulence in the air adjacent the burners, gas burners in the upper portion of the shed, carbon collecting members above the burners so placed that the flames from the burners impinge on the carbon collecting members and deposit carbon thereon, the improvement which comprises means in the shed adjacent the air inlets baffling and diffusing the streams of air so that the air enters the shed beyond such means at a velocity of not more than one-fifth the velocity at which it passes through the air inlets.

2. In an apparatus for making carbon black by the impingement process which includes a shed having outlets for gaseous products at the top thereof and small air inlets adjacent the bottom thereof controlling the amount of air entering the shed and through which inlets the streams of air normally enter the shed at a velocity sufficient to cause substantial turbulence in the air adjacent the burners, gas burners in the upper portion of the shed, carbon collecting members above the burners so placed that the flames from the burners impinge on the carbon collecting members and deposit carbon thereon, the improvement which comprises air-diffusing baffles in the shed adjacent the air inlets extending in front of and above the air inlets and spaced from the air inlets a substantial distance to provide an expansion chamber for the streams of air, said air-diffusing baffles having air outlets of an area at least five times the area of the air inlets, the air-diffusing baffles and their outlets being so positioned that the streams of air from the air inlets strike the baffles, expand and pass through the air outlets at a substantially reduced velocity.

3. In an apparatus for making carbon black by the impingement process which includes a shed having outlets for gaseous products at the top thereof and small air inlets in the side walls adjacent to but spaced from the bottom thereof by a distance substantially greater than the width of the inlets controlling the amount of air entering the shed and through which inlets the streams of air normally enter the shed at a velocity sufficient to cause substantial turbulence in the air adjacent the burners, gas burners in the upper portion of the shed, carbon collecting members above the burners, so placed that the flames from the burners impinge on the carbon collecting members and deposit carbon thereon, the improvement which comprises air-diffusing baffles in the shed adjacent the air inlets, each air-diffusing baffle having an upper wall above the air inlet extending substantially horizontally from the wall of the shed into the shed a distance substantially greater than the width of the air inlet and a substantially vertical wall extending downwardly from the outer edge of the horizontal wall to a point below the air inlet but having its lower edge spaced from the bottom wall of the shed by a distance greater than the width of the air inlet and sufficient to provide an air outlet of an area at least five times the area of the air inlet, so that the streams of air from the air inlets strike the vertical walls, expand and pass through the air outlets at a substantially reduced velocity.

4. In an apparatus for making carbon black by the impingement process which includes a shed having outlets for gaseous products at the top thereof and small air inlets in the side walls closely adjacent to the bottom thereof controlling the amount of air entering the shed and through which inlets the streams of air normally enter the shed at a velocity sufficient to cause substantial turbulence in the air adjacent the burners, gas burners in the upper portion of the shed, carbon collecting members above the burners so placed that the flames from the burners impinge on the carbon collecting members and deposit carbon thereon, the improvement which comprises air-diffusing baffles in the shed adjacent the air inlets, each air-diffusing baffle having an upper wall spaced above the air inlet by a distance substantially greater than the width of the inlet and extending substantially horizontally from the wall of the shed into the shed a distance substantially greater than the width of the air inlet and a substantially vertical wall extending upwardly from the bottom of the shed toward the outer edge of the horizontal wall to a point above the air inlet but having its upper edge spaced from the horizontal wall by a distance greater than the width of the air inlet and sufficient to provide an air outlet at least five times the area of the air inlet, so that the streams of air from the air inlets strike the vertical walls, expand and pass through the air outlets at a substantially reduced velocity.

5. In an apparatus for making carbon black by the impingement process which includes a shed having outlets for gaseous products at the top thereof and small air inlets adjacent the bottom thereof controlling the amount of air entering the shed and through which the streams of air normally enter the shed at a velocity sufficient to cause substantial turbulence in the air adjacent the burners, gas burners in the upper portion of the shed, carbon collecting members above the burners so placed that the flames from the burners impinge on the carbon collecting members and deposit carbon thereon, the improvement which comprises air-diffusing baffles in the shed adjacent the air inlets extending in front of and above the air inlets and spaced from the air inlets a substantial distance to provide an expansion chamber for the air, said air-diffusing baffles having walls of wire screen of approximately 16 mesh to provide air outlets of an area at least five times the area of the air inlets, the air-diffusing baffles being so positioned that the streams of air from the air inlets strike the baffles, expand and pass through the air outlets at a substantially reduced velocity.

6. In an apparatus for making carbon black by the impingement process which includes a shed having outlets for gaseous products at the top thereof and a series of small horizontally spaced horizontal slots in each side wall adjacent the bottom thereof forming air inlets controlling the amount of air entering the shed and through which the streams of air normally enter the shed at a velocity sufficient to cause substantial turbulence in the air adjacent the burners, gas burners in the upper portion of the shed, carbon collecting members above the burners so placed that the flames from the burners impinge on the carbon collecting members and deposit carbon thereon, the improvement which comprises air-diffusing baffles in the shed adjacent the air inlets, each air-diffusing baffle extending substantially the length of the shed and having walls above the air inlets extending from the wall of the shed a substantial distance into the shed and in front of but spaced from the air inlets a substantial distance to form an expansion chamber for the streams of air, and air outlets in the walls of the baffles of an area at least five times the area of the air inlets, the air-diffusing baffles and their outlets being so positioned that the streams of air from the air inlets strike the baffles, expand and pass through the air outlets at a substantially reduced velocity.

IRA WILLIAMS.
FRANK W. SELFRIDGE.